Dec. 2, 1941.   S. JENCICK   2,264,981
BICYCLE
Filed Dec. 27, 1938   2 Sheets-Sheet 1
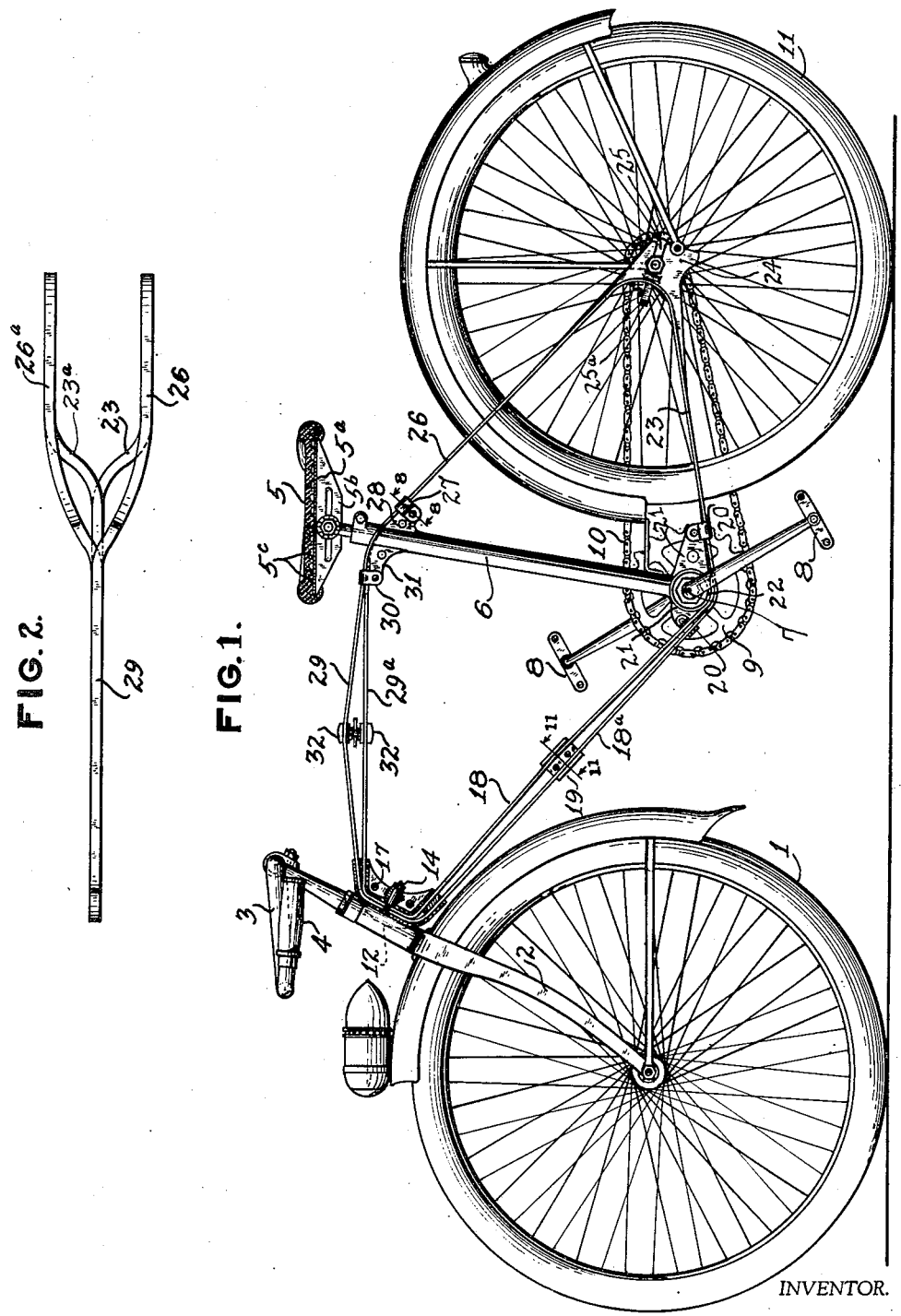
INVENTOR.
STEPHEN JENCICK.
BY Milburn & Milburn
ATTORNEYS.

Dec. 2, 1941.  S. JENCICK  2,264,981
BICYCLE
Filed Dec. 27, 1938  2 Sheets-Sheet 2
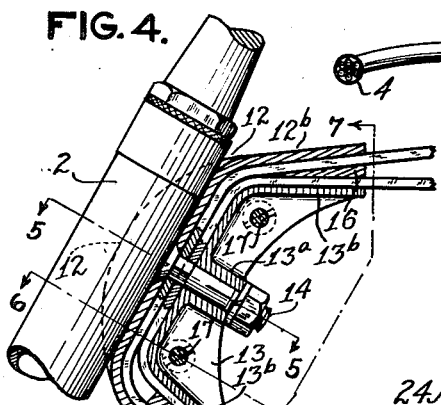
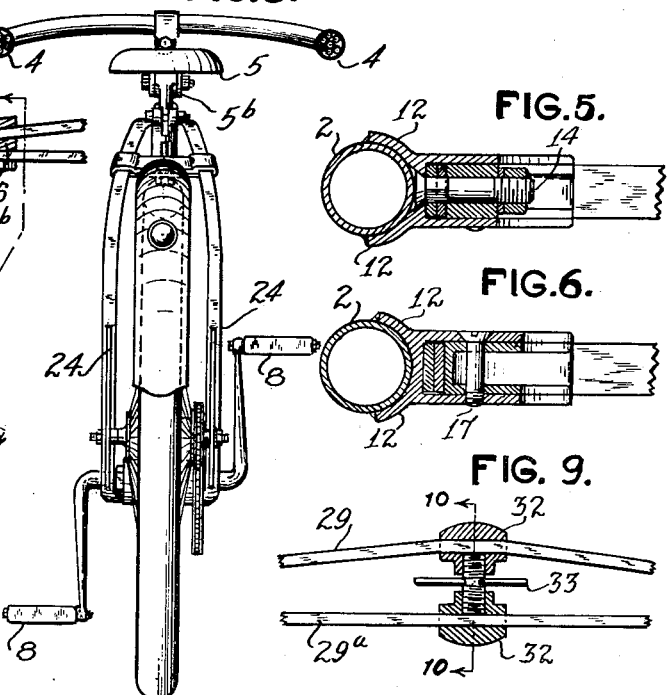
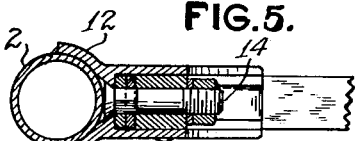
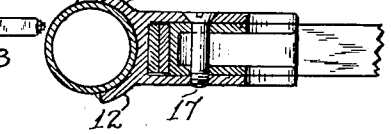
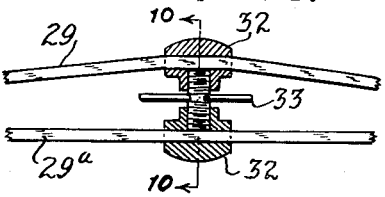
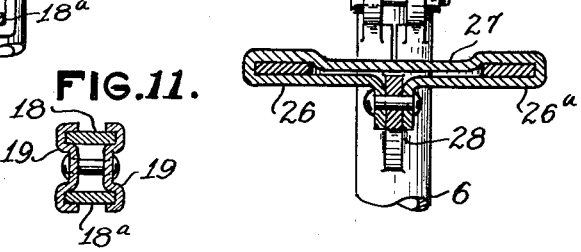
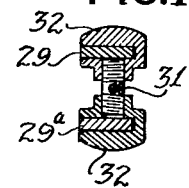
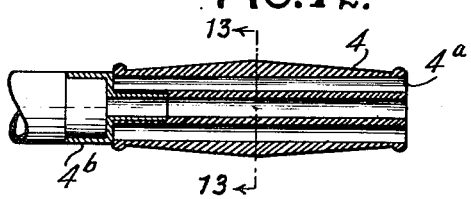
INVENTOR.
STEPHEN JENCICK.
BY *Milburn & Milburn*
ATTORNEYS.

Patented Dec. 2, 1941

2,264,981

UNITED STATES PATENT OFFICE 2,264,981

BICYCLE

Stephen Jencick, Chagrin Falls, Ohio

Application December 27, 1938, Serial No. 247,935

3 Claims. (Cl. 280—283)

This invention relates to the art of bicycles and the like.

As is well known, the main frame of the conventional bicycle is made up of tubular members which are rigid and which consequently transmit the shock or vibration to which the wheels are subjected as they encounter rough places in the road-way. The result is that such shock or vibration is transmitted to the saddle with obvious discomfort to the rider; and it is practically impossible to travel at desired speed, if at all, over rough road-ways. Likewise, the same objectionable effect is experienced also through the hand-grips of the handle bar. Furthermore, the bicycle itself is subject to the strain of this vibration with obvious results.

It is, therefore, the primary object of this invention to devise a bicycle or the like in which there is provided means for preventing the transmission of vibration or shock through the frame, and thus to relieve the rider of the discomfort which would otherwise be occasioned by the irregularities in the road surface.

More specifically, it is my primary object to devise a bicycle or the like with a flexible frame that is capable of absorbing vibration or shock, together with means for adjusting the same so as to vary its flexibility in accordance with the factors of load to be carried and condition of the road surface to be traveled at any given time.

Another specific object is to devise a form of hand-grip for the handle bar that is capable of absorbing vibration or shock so as to thereby prevent transmission of the same to the arms of the rider.

A further specific object is to devise an improved form of saddle.

Other objects will appear from the following description and claims when considered together with the accompanying drawings.

Fig. 1 is a side elevation of a bicycle embodying my present invention;

Fig. 2 is a diagrammatic plan view illustrating the general form of main frame as employed in my improved bicycle construction;

Fig. 3 is a rear elevation of my improved bicycle construction;

Fig. 4 is an enlarged sectional view of the front part of my improved frame;

Figs. 5, 6 and 7 are views taken on lines 5—5, 6—6 and 7—7, respectively, of Fig. 4;

Fig. 8 is a view taken on line 8—8 of Fig. 1;

Fig. 9 is a vertical sectional view of the means of adjustment provided in the cross-bar of the frame;

Fig. 10 is a view taken on line 10—10 of Fig. 9;

Fig. 11 is a view taken on line 11—11 of Fig. 1;

Fig. 12 is a longitudinal sectional view of the improved form of hand-grip; and

Fig. 13 is a view taken on line 13—13 of Fig. 12.

It is to be understood that the present form of illustration is merely for purposes of disclosing the invention so as to be fully and clearly understood and that there may be devised various modifications therein without departing from the spirit underlying the same as herein set forth and claimed.

Referring to the accompanying drawings, the front wheel 1 is mounted in the usual manner upon the front fork 2 which supports the handle bar 3 with my improved hand-grip 4, to be referred to hereinafter.

The rider's seat or saddle is mounted upon the middle post 6 in the usual manner and there is provided also in the usual manner at the lower end of post 6 the hub 7 for the shaft of the foot pedals 8. The front sprocket 9 is mounted upon the pedal shaft and has drive connection through chain 10 with the sprocket for the rear wheel 11.

Having now referred briefly to the general construction of a bicycle, I will now describe my new construction of main frame. This frame has the same general shape as that of the conventional man's bicycle—namely, a substantially parallelogram shape. As will be understood, the main frame extends between the front fork 2, the top of the middle post 6, the axle of the rear wheel 11 and the hub of the pedals 8 at the lower end of the middle post 6. Thus, my invention does not involve any substantial change in the general shape of the main frame, as just referred to; but the present invention resides primarily in the particular construction of the main frame itself, as will be explained.

In my present improved form of construction, the main frame is made of one continuous strip of spring metal in double strand arrangement throughout the entire extent thereof. Suitable means are provided for securing this strip metal at the four points above referred to, as will be more fully explained.

The two ends of this strip are brought together at the front end of the frame, that is at the front fork. In order to understand this arrangement more clearly, it will be explained that beginning with one end of this strip, it extends twice about the parallelogram form and terminates opposite the first end of the strip, these two ends being in abutment with each other and welded together.

At the point just referred to, the two strands of the metal strip overlie each other and are secured in such position in the manner indicated in Figs. 4, 5, 6 and 7 of the drawings. The duplicate side plates 12 are welded to the opposite sides of the fork 2 so as to provide a channel seat within which the overlying strands of the strip are secured by clamping engagement of the cleat 13. Clamping engagement between these parts is effected by means of the bolt 14 which has its one end welded to the fork 2 and which extends through the hub portion 13a of the cleat 13. The members 12 and 13 have overlying diverging flanges 12b and 13b between which the strands of the metal strip extend, and wedge members 15 and 16 are provided for effecting engagement of the strip with the flanges just referred to. The bolts 17 extend through the flanges of the side plates 12 and serve to clamp the parts in engagement transversely.

Throughout the front lower part of the main frame, the strands of the metal strip are in overlying spaced arrangement, as indicated by reference numerals 18 and 18a; and they are held in such manner by means of spacers 19 riveted together, as indicated in Fig. 11.

At the bottom corner of the parallelogram form of frame, the strands of the metal strip are secured in overlying contactual arrangement by means of the clamping members 20 through which the strands extend and which are riveted to the plates 21 which, in turn, are welded to the front and rear sides of the housing 22 of the hub for the pedal levers. The members 20, in open position, are sprung into engagement about the strands of the metal strip and are then riveted in closed position, as indicated in the drawings. The overlying strands of the metal strip extend about the under-side of the housing 22.

At the rear part of the parallelogram form of frame, the strands 23 and 23a thereof are spread apart, as indicated in Fig. 2, so as to provide space therebetween for mounting the rear wheel. At the rear corner portions of the parallelogram form of frame, each strand of the metal strip has welded thereto a plate 24, which are parallel to each other and are slotted, as indicated at 25, for the assembly of the rear wheel in the usual manner. The adjustable screws 25ª extend through the metal strip strands so as to engage the shaft which engages in the slots 25 and upon which the rear wheel is mounted.

The plates 24 extend also partially along the strands 23 and 23a and the strands 26 and 26a which form the upper rear part of the parallelogram frame, these plates serving to stiffen the rear part of the frame to the necessary extent. This provision is aided also by the location of the clamp 20 at a point sufficiently rearwardly of the hub.

At the upper corner portion of the parallelogram frame, the strands of the metal strip are on opposite sides of the middle post 6. At the rear of the post 6, the strands 26 and 26a extend in converging relation and are secured in such position by means of the double clamp 27 which is sprung into such engagement and then has its ends riveted to the plate 28 which is welded to the rear side of the post 6.

At the front of the post 6, the strands 29 and 29a occupy overlying relation and are secured together by means of the clamp 30 which is sprung into such engagement and then has its ends riveted to the plate 31 which is welded to the front of the post 6.

The strands 29 and 29a of the metal strip constitute what is familiarly known as the crossbar. These strands are provided with an adjustable spacing means at a point substantially midway of the length thereof, for the purpose of varying the flexibility of this part of the frame, as will be more fully explained. This is accomplished by means of a reversely threaded member 31 in engagement at its two ends with the open-sided jaw members 32 through which the strands 29 and 29a extend. The member 31 can be turned by means of the pin 33 so as to draw these strands closer together or spread them farther apart, and thereby vary the flexibility thereof. Thus, I have provided a simple and readily accessible means for varying the resilience of the cross-bar and hence the main frame.

If so desired, another means of adjustment like that just described may be provided between the strands 18 and 18a, although this has not been found necessary in actual experience.

With my means of adjustment, the flexibility of the cross-bar can be varied according to the weight of the rider and the condition of the road being traveled at any given time. As will be understood, the flexibility of the cross-bar will be greater for a rider of light weight and less for a rider of greater weight. Likewise, the flexibility of the cross-bar will be greater for comparatively rough roads and less for comparatively smooth roads.

Since the greater part of the weight is ordinarily located towards the rear part of the bicycle rather than towards the front, I have made the rear part of the frame with less resilience than the front part thereof, as above described. However, the resilience of the cross-bar can be reduced by means of the adjustment described, in case the rider should assume a forwardly inclined position so as to place more of his weight towards the front part of the bicycle.

It is to be understood that the degree of resilience of the frame may be varied in the designing and construction of the bicycle, by the selection of metal with respect to character and dimensions, and also by varying the other features herein described.

Although the present disclosure is in connection with a man's bicycle, yet my present invention can be embodied in a lady's bicycle without the cross-bar and also in other forms of such devices regardless of the number of wheels. Thus, in the use of the word "bicycle" in the present description and claims, it is intended to be understood not in a limited sense but only as indicating a class of devices.

As a means of preventing the transmission of shock up through the front fork to the hands and arms of the rider, I have devised a special form of hand-grip 4. It is made of soft rubber which has a pronounced cushioning effect and in which I provide a plurality of air cores 4a of suitable number and diameter. This rubber grip member is applied to the reduced end of ferrule 4b, the larger end of which is applied to the end of the handle bar. The reduced end of the ferrule 4b extends only a comparatively short distance into the hand-grip which is thus free to exert its shock-absorbing characteristic throughout substantially its entire extent. In the present illustration, I have shown this hand-grip as being provided with a central air core and six other concentrically arranged air cores of the same diameter. However, the number and size of these air cores may vary, as may also the degree of softness possessed by the rubber, so long as it has the desired shock-absorbing characteristic as herein contemplated.

Thus, even though the front fork 2 may be of rigid nature, yet any vibration or shock transmitted thereby from the front wheel will not be permitted to reach the rider through his hands and arms because of this particular form of hand-grip; while the particular form of frame as herein described will prevent any such shock or vibration from being otherwise transmitted to the body of the rider. Thus this combination of frame and hand-grip constitutes a means of completely insulating the rider against the discomfort of vibration or shock to which he would otherwise be subjected.

My improved saddle embodies a soft rubber pad 5 whose marginal portion has snap engagement over the edge of the metal base 5a which has its depending flanges 5b adjustably mounted upon the stem in the center post 6. As indicated in Fig. 1, the under-side of the rubber pad 5 is provided with a plurality of air pockets 5c which may be of any desired form, as for instance straight or annular channels, or depressions of spherical or other form. Thus, I have devised a saddle which is of comparatively simple construction and which, at the same time, has proved to be extremely comfortable by virtue of its cushioning character, due to the nature of material employed in the pad 5 and the air pockets 5c which augment the cushioning effect. This cushion seat as well as the cushion hand-grips will co-operate with the frame in increasing the comfort of the rider.

Also, with my present structure, it is possible to travel certain road-ways at rates of speed heretofore impossible with the ordinary bicycle.

Another advantage of my present improved bicycle structure resides in the fact that the structure itself as well as the rider is relieved of the vibration and shock and consequently the life of the bicycle is prolonged and the cost of its up-keep reduced.

What I claim is:

1. In the art of bicycles and the like, the combination of front and rear wheels, a main frame associated with said wheels, and a seat upon said main frame, said main frame having substantially the form of a parallelogram with a substantially horizontal cross-bar, at least a part of the main frame, including the cross bar, having vertically spaced overlying strips of spring metal so as to afford a resilience for preventing transmission of shock from the wheels to the rider's seat and permanent manual means of vertical adjustment provided between the overlying strips in said cross-bar and readily accessible from the seated position of the rider for varying the degree of resilience.

2. In the art of bicycles and the like, the combination of front and rear wheels, a main frame associated with said wheels, and a seat upon said main frame, said main frame having substantially the form of a parallelogram with a substantially horizontal cross-bar and being formed entirely of spring strip metal to afford resilience for preventing transmission of shock from the wheels to the seat, said cross-bar having vertically spaced multiple strips of said spring metal, and permanent manual vertically adjustable means between said overlying strips and readily accessible to the seated rider for varying the tautness thereof so as to thereby vary the degree of resilience.

3. In the art of bicycles and the like, the combination of front and rear wheels, a main frame associated with said wheels, and a seat upon said main frame, said main frame comprising a single strip of spring metal arranged in multiple strands throughout the entire extent thereof, the strands of strip metal occupying substantially directly overlying relation in the forward part thereof and being spaced apart laterally in the rearward part thereof so as to accommodate the rear wheel, and permanent manual means provided in the front part of said frame between said strands for varying the space vertically between the strands and readily accessible to the seated rider so as to vary the effective resilience thereof.

STEPHEN JENCICK.